(12) United States Patent
Tuck et al.

(10) Patent No.: US 10,875,663 B2
(45) Date of Patent: Dec. 29, 2020

(54) LIGHTNING PROTECTION IN AIRCRAFTS CONSTRUCTED WITH CARBON FIBER REINFORCED PLASTIC

(71) Applicant: The Boeing Company, Chicago, IL (US)

(72) Inventors: Derek R. Tuck, Charleston, NC (US); Philipp A. Boettcher, Philadelphia, PA (US); Carson Alexander Smith, Summerville, SC (US); David Thomas Misciagna, West Chester, PA (US)

(73) Assignee: The Boeing Company, Chicago, IL (US)

(*) Notice: Subject to any disclaimer, the term of this patent is extended or adjusted under 35 U.S.C. 154(b) by 407 days.

(21) Appl. No.: 15/838,008

(22) Filed: Dec. 11, 2017

(65) Prior Publication Data

US 2019/0177003 A1    Jun. 13, 2019

(51) Int. Cl.
| | |
|---|---|
| *B64D 45/02* | (2006.01) |
| *B29C 65/56* | (2006.01) |
| *B29C 65/00* | (2006.01) |
| *B29C 70/02* | (2006.01) |
| *B29C 70/54* | (2006.01) |
| *B29C 70/88* | (2006.01) |
| *B64C 3/26* | (2006.01) |
| *B29K 307/04* | (2006.01) |
| *B29L 31/30* | (2006.01) |

(52) U.S. Cl.
CPC ........... *B64D 45/02* (2013.01); *B29C 65/562* (2013.01); *B29C 66/1122* (2013.01); *B29C 66/43* (2013.01); *B29C 66/7212* (2013.01); *B29C 66/7314* (2013.01); *B29C 70/028* (2013.01); *B29C 70/54* (2013.01); *B29C 70/882* (2013.01); *B64C 3/26* (2013.01); *B29K 2307/04* (2013.01); *B29K 2995/0005* (2013.01); *B29L 2031/3085* (2013.01); *Y10T 428/19* (2015.01)

(58) Field of Classification Search
CPC ........ Y10T 428/19; B64D 3/26; B64D 45/02; B29C 70/882; B29C 66/1122; B29C 66/43; B29C 66/7314
USPC ............................ 428/57, 223; 244/131, 1 A
See application file for complete search history.

(56) References Cited

FOREIGN PATENT DOCUMENTS

| | | |
|---|---|---|
| EP | 0248122 A2 | 12/1987 |
| EP | 2500272 A2 | 9/2012 |

(Continued)

OTHER PUBLICATIONS

European Search Report; Application 18211576.6-1010; dated Mar. 4, 2019.

*Primary Examiner* — Alexander S Thomas
(74) *Attorney, Agent, or Firm* — Duft & Bornsen, PC

(57) ABSTRACT

The embodiments described herein provide for lightning protection in aircrafts constructed with Carbon Fiber Reinforced Plastic (CFRP). In one embodiment, the apparatus includes a first Carbon Fiber Reinforced Plastic (CFRP) panel, a second CFRP panel that overlaps with the first CFRP panel in a vertical direction, and a fastener to join the first CFRP panel with the second CFRP panel, the fastener extending in the vertical direction in an area where the first CFRP panel and the second CFRP panel overlap. The apparatus further includes a plurality of electrically conductive pins in each of the first CFRP panel and the second CFRP panel, wherein the pins extend in the vertical direction proximate to the fastener to electrically connect the first CFRP panel and the second CFRP panel in the area where the first CFRP panel and the second CFRP panel overlap.

20 Claims, 11 Drawing Sheets

(56) References Cited

FOREIGN PATENT DOCUMENTS

EP 2500272 A3 5/2015
EP 2921292 A1 9/2015

LIGHTNING PROTECTION IN AIRCRAFTS CONSTRUCTED WITH CARBON FIBER REINFORCED PLASTIC

FIELD

This disclosure relates to the field of aircrafts, and in particular, to lightning protection in aircrafts constructed with carbon fiber reinforced plastic.

BACKGROUND

Modern aircrafts are increasingly constructed with components made of Carbon Fiber Reinforced Plastic (CFRP). Compared with aluminum alloys conventionally used in aircraft and aerospace construction, CFRP provides a structure that is strong and lightweight. However, since CFRP panels have low conductivity, high levels of current from a lightning strike may be undesirably concentrated where two panels are joined together by a metal fastener.

SUMMARY

Conductive pins are inserted through a CFRP panel to increase through-thickness conductivity near a fastener. In the event of a lightning strike, the pins distribute the current more evenly in the composite layers of the CFRP panel and spread through-thickness current conduction away from the fastener. The pins are therefore able to decrease the probability of ignition hazards, particularly in areas of an aircraft such as the wings where fuel sources may be present. Unlike conventional lightning mitigation techniques (e.g., covering the fastener with a polysulfide cap seal, applying edge sealant, and/or bonding existing panels with a conductive splice), the pins may be fabricated within a CFRP panel to reduce weight and may be inserted in an automatable fashion with no additional cure time to benefit factory flow.

One embodiment comprises an apparatus that includes a first Carbon Fiber Reinforced Plastic (CFRP) panel, a second CFRP panel that overlaps with the first CFRP panel in a vertical direction, and a fastener to join the first CFRP panel with the second CFRP panel, the fastener extending in the vertical direction in an area where the first CFRP panel and the second CFRP panel overlap. The apparatus further includes a plurality of electrically conductive pins in each of the first CFRP panel and the second CFRP panel, wherein the pins extend in the vertical direction proximate to the fastener to electrically connect the first CFRP panel and the second CFRP panel in the area where the first CFRP panel and the second CFRP panel overlap.

Another embodiment comprises a method that includes identifying a first Carbon Fiber Reinforced Plastic (CFRP) panel and a second CFRP panel to be joined, determining an area where the first CFRP panel and the second CFRP panel are to overlap in a vertical direction, and determining a location for a fastener to be inserted into the area in the vertical direction to join the first CFRP panel and the second CFRP panel. The method further includes inserting a plurality of electrically conductive pins into the area in the vertical direction at positions proximate to the location for the fastener.

Another embodiment comprises a composite structure for an aircraft. The composite structure includes a plurality of Carbon Fiber Reinforced Plastic (CFRP) panels that are horizontally adjacent with one another, each CFRP panel including: an upper surface having a mesh foil, a fastener inserted through the CFRP panel in a vertical direction, the fastener configured to secure the CFRP panel to a metallic frame of the aircraft located proximate to a lower surface of the CFRP panel, and a plurality of electrically conductive pins extending in the vertical direction to electrically connect the mesh foil and the metallic frame of the aircraft.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
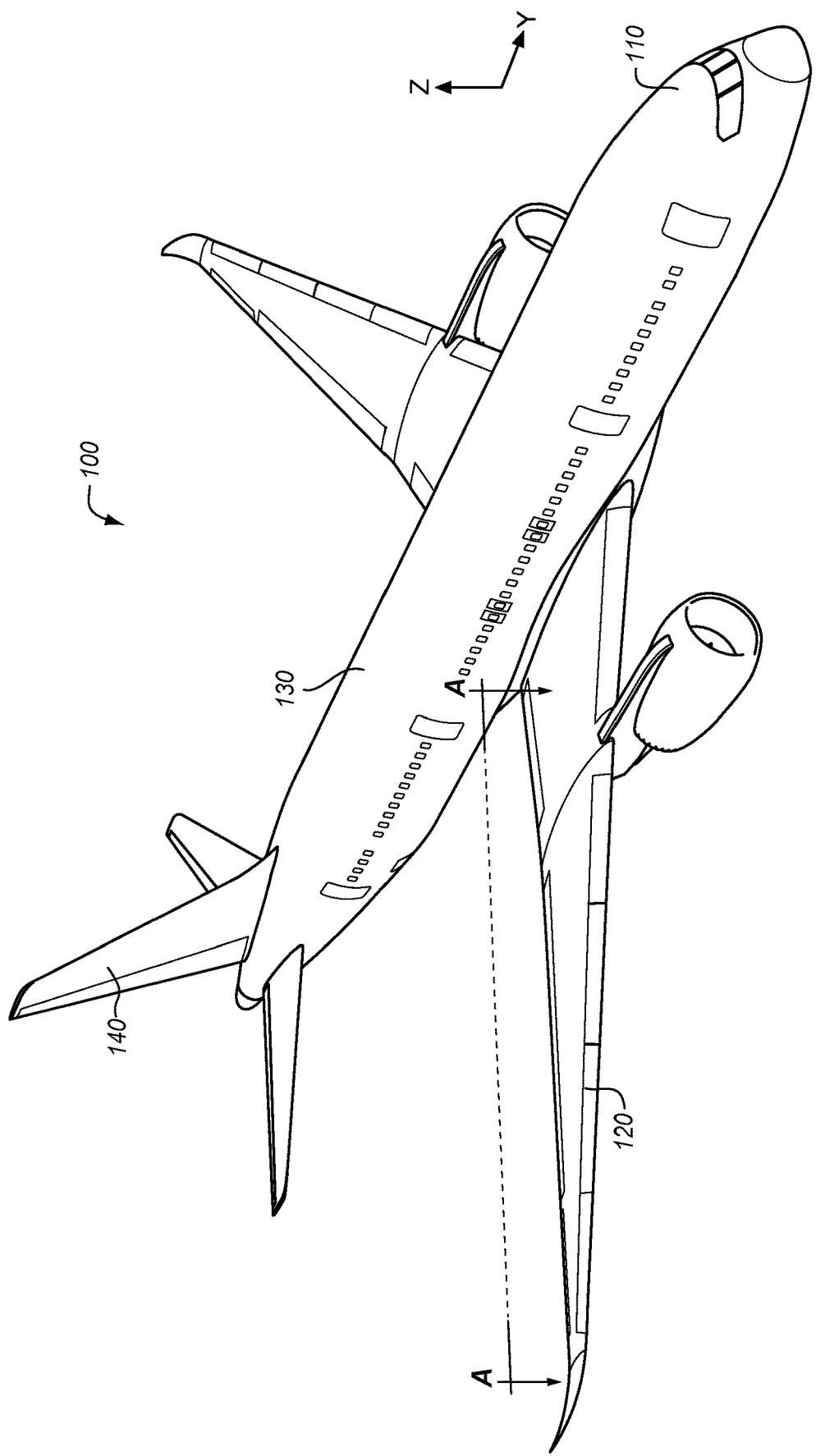
FIG. 1 illustrates an aircraft in an example embodiment.

FIG. 1 illustrates an aircraft 100 in an example embodiment. The aircraft 100 includes nose 110, wing 120, fuselage 130, and tail 140. Further discussion of the aircraft 100 focus on composite material of the wing 120 of the aircraft 100. However, similar configurations and techniques to those described herein may be applied to any suitable composite part for the aircraft 100 as well as alternative aircrafts and other types of vehicles.

Figure 2:
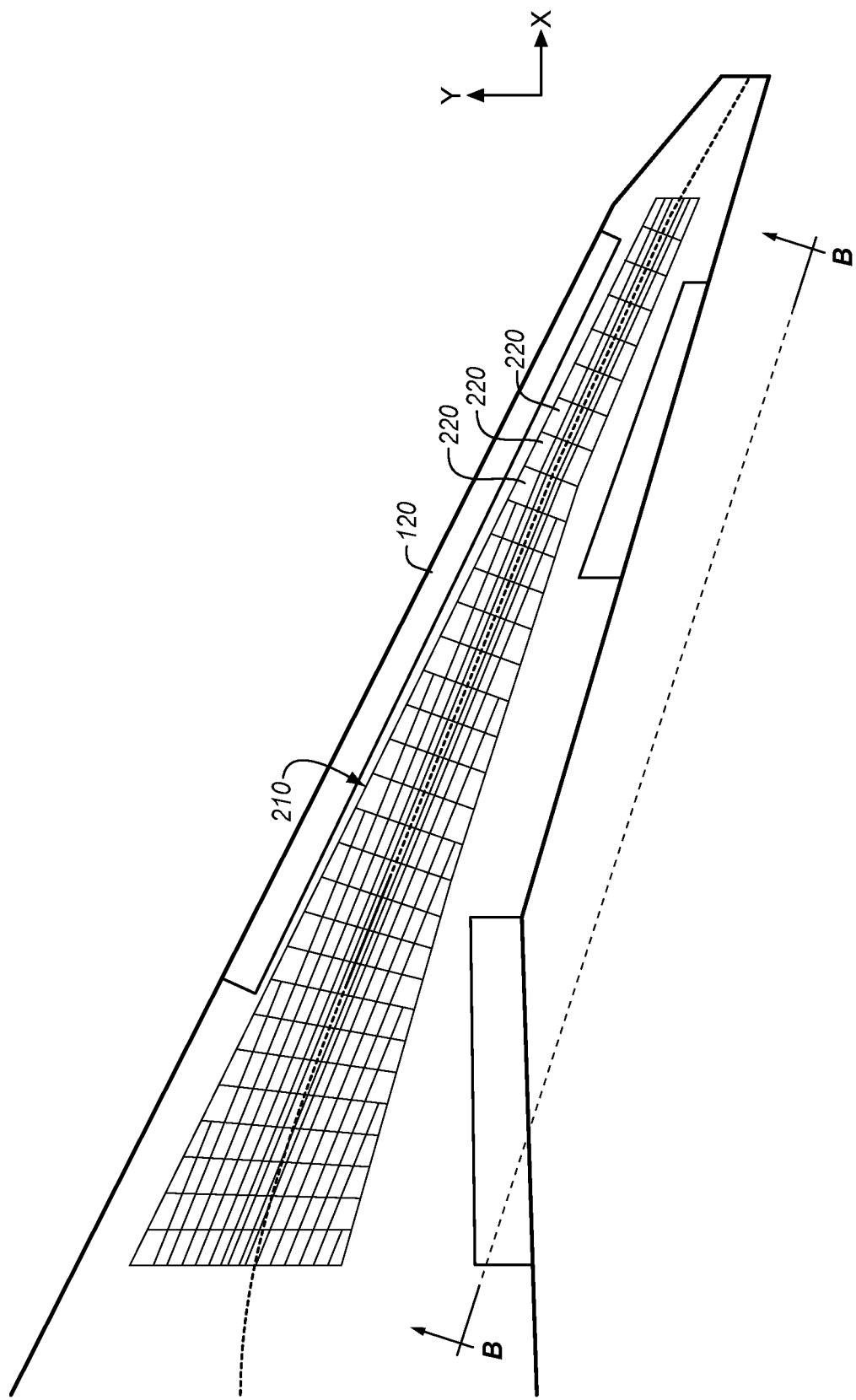
FIG. 2 illustrates a wing of the aircraft that includes a composite structure of multiple panels in an example embodiment.

FIG. 2 illustrates the wing 120 of the aircraft 100 that includes a composite structure 210 of multiple Carbon Fiber Reinforced Plastic (CFRP) panels 220 in an example embodiment. In particular, the composite structure 210 comprises a portion of an upper wing skin. The view of FIG. 2 is shown by view arrows A of FIG. 1. As shown in FIG. 2, each CFRP panel 220 comprises a small portion of the area of the composite structure 210. View arrows B along FIG. 2 indicate a possible view along the length of the wing 120.

Figure 3:
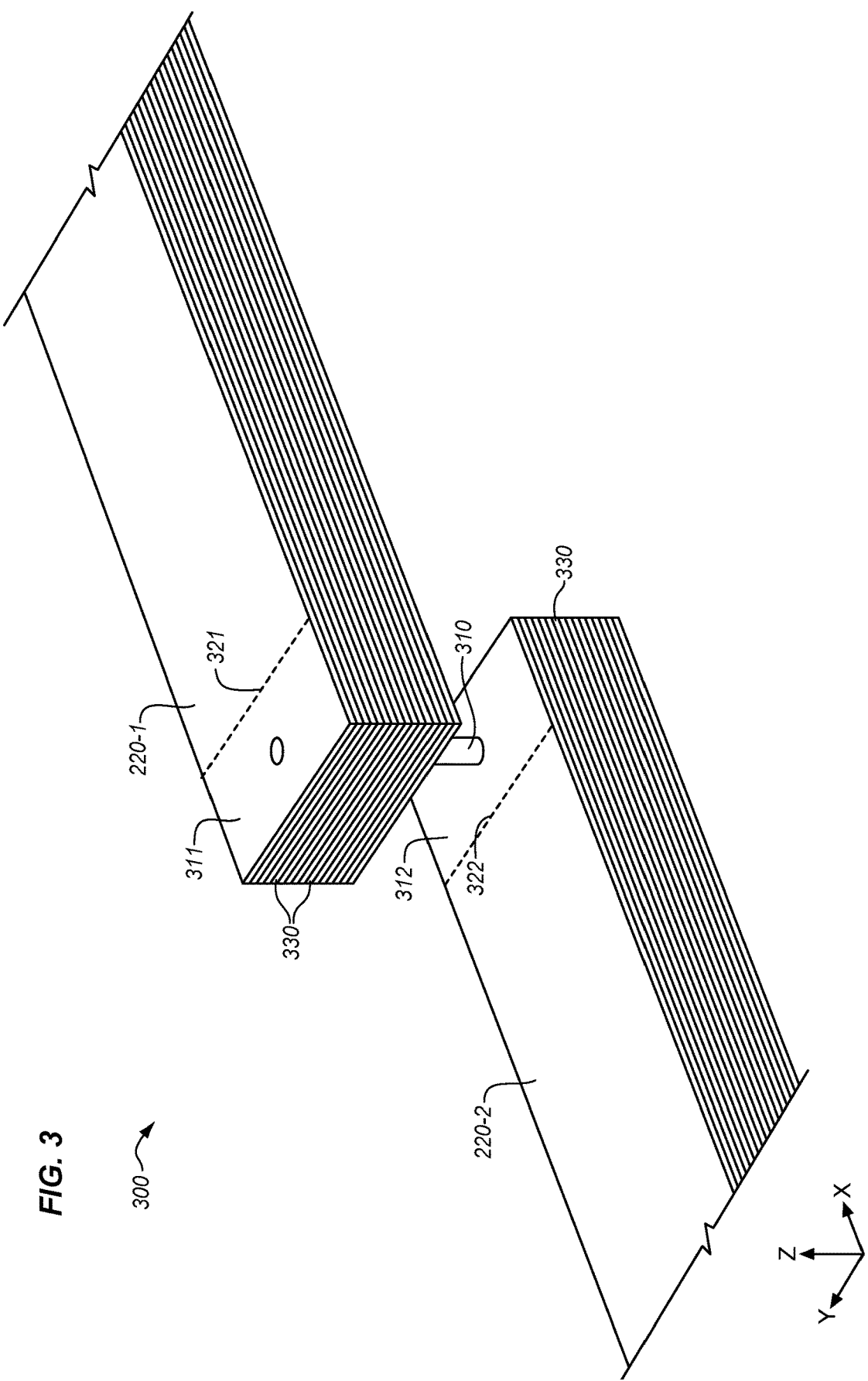
FIG. 3 is a partially exploded view of CFRP panels joined together by a fastener in an example embodiment.

FIG. 3 is a partially exploded view 300 of the CFRP panels 220 joined together by a fastener 310 in an example embodiment. In this view, the CFRP panels 220 are shown separated to illustrate the joined configuration of the CFRP panels 220, which may be in contact despite their apparent separation in this exploded view. Particularly, opposite ends of a first CFRP panel 220-1 and a second CFRP panel 220-2 overlap vertically (i.e., in the z-direction) to form respective overlap areas 311-312 (i.e., in the xy-plane) defined by boundaries 321-322. The CFRP panels 220 each include one or more layers 330 of carbon fiber-reinforced plies. The fibers may have different orientations among the layers 330 to increase strength of the CFRP panels 220 along different dimensions.

The fastener 310 is inserted through the CFRP panels 220 in the vertical direction (i.e., z-direction) to join the CFRP panels 220 together. The term vertical direction denotes a relative position of the CFRP panels 220 that is generally parallel with a thickness of the CFRP panels 220 and perpendicular to a flat plane of the CFRP panels 220, although alternative geometries of the CFRP panels 220 other than that shown in FIG. 3 is possible. In general, the fastener 310 includes a conductive metallic material (e.g., aluminum, titanium, stainless steel, etc.) and may include a bolt and a nut, a rivet, a blind fastener, or another fastener device suitable for mechanically joining the CFRP panels 220. As such, the fastener 310 provides a through-thickness conductivity in the CFRP panels 220 in the z-direction, sometimes referred to herein as a vertical direction. The layers 330 of the CFRP panels 220, by contrast, have anisotropic conductivity in which current is forced in a direction parallel along the layers 330 in the xy-plane. As a result, when lightning strikes one of the CFRP panels 220, high levels of current may be undesirably concentrated at the fastener 310, potentially degrading the integrity of the fastening connection or causing the fastener 310 to spark and create an ignition hazard.

Figure 4:
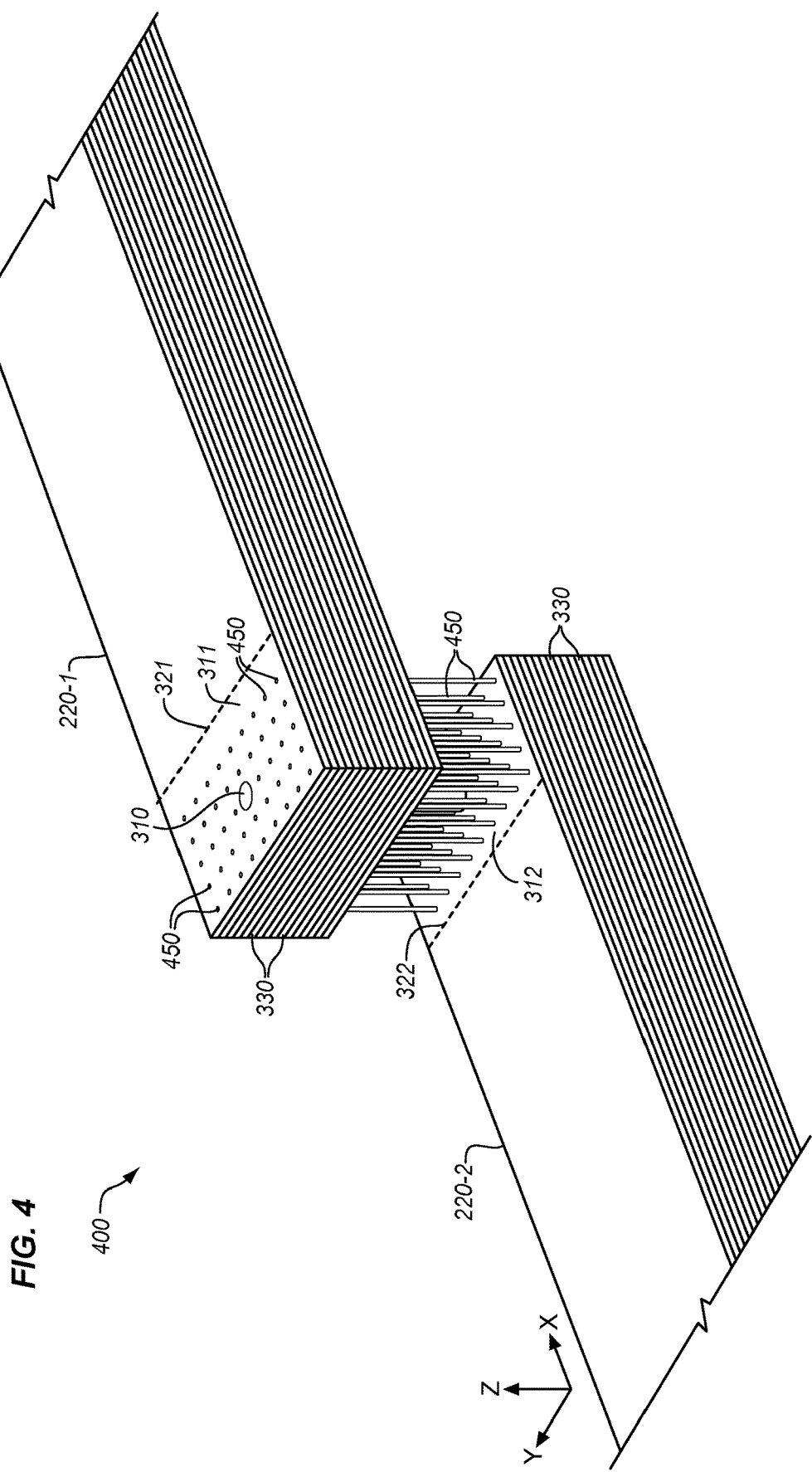
FIG. 4 illustrates a partially exploded view of CFRP panels joined together by a fastener and enhanced with electrically conductive pins in an example embodiment.

FIG. 4 illustrates a partially exploded view 400 of the CFRP panels 220 joined together by a fastener 310 and enhanced with electrically conductive pins 450 in an example embodiment. The pins 450 may include any suitable material (e.g., carbon, aluminum, titanium, etc.) having a long axis extending generally in a vertical direction (i.e., z-direction) to electrically connect the CFRP panels 220. The pins 450 generally differ from the fastener 310 in terms of size, numbers, and function. For example, multiple pins 450 may surround a single fastener 310 in the xy-plane and individually occupy a fraction of the area in the xy-plane as compared to the fastener 310 (e.g., so as not to degrade the structural integrity of the CFRP panels 220). In other embodiments, the pins 450 may surround multiple fasteners 310. In further embodiments, the pins 450 may provide paths for electrical current without any mechanical fastening means. In general, the pins 450 are distributed/interspersed throughout the overlap areas 311-312 of the CFRP panels 220 to provide a technical benefit of spreading through-thickness current conduction away from the fastener 310 to decrease current concentration at the fastener 310 and thus decrease the probability of current-induced damage at or near CFRP-fastener interfaces.

Figure 5:
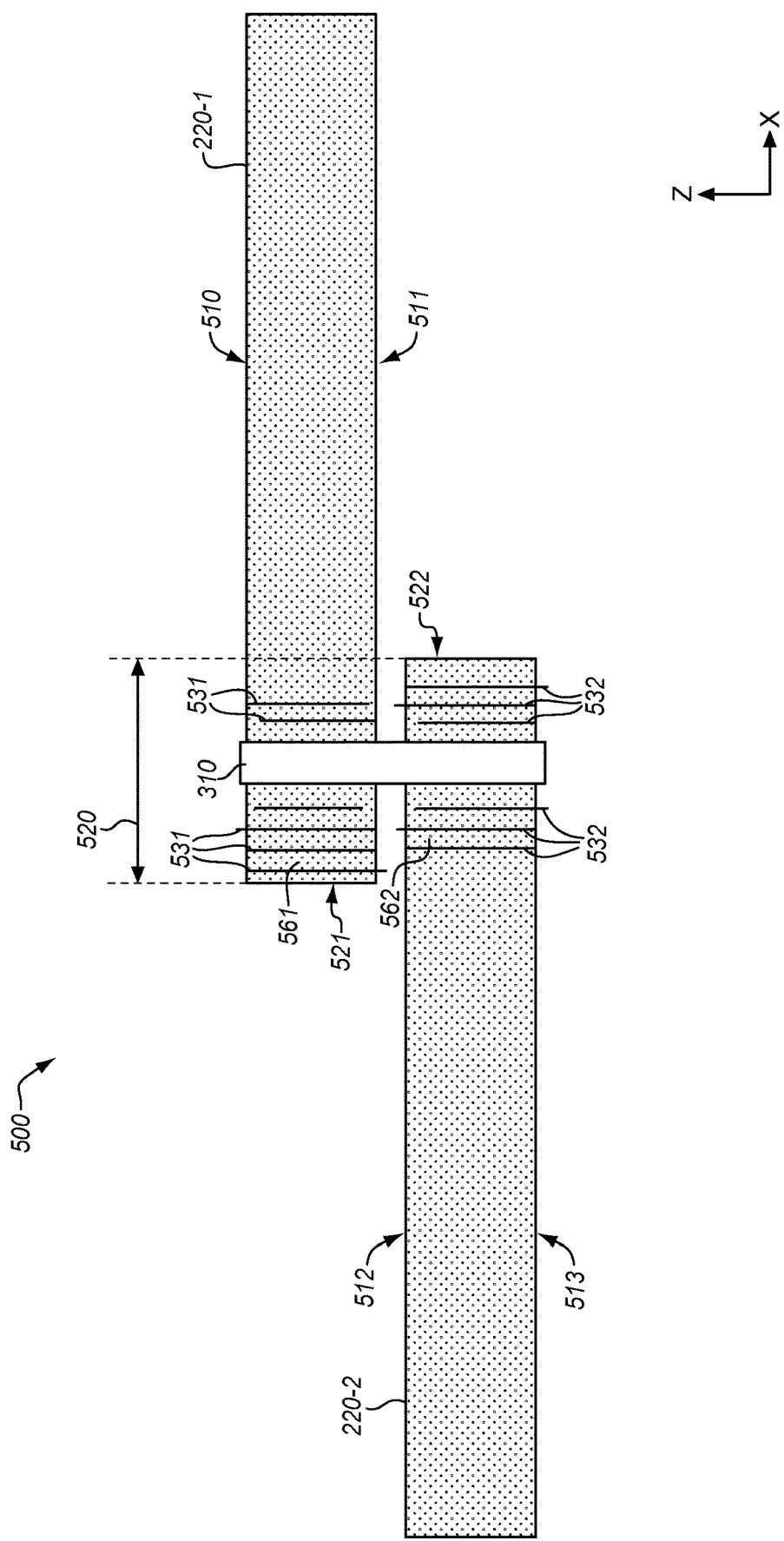
FIG. 5 is a side view of the CFRP panels joined together by a fastener and enhanced with electrically conductive pins in an example embodiment.

FIG. 5 is a side view 500 of the CFRP panels 220 joined together by a fastener 310 and enhanced with electrically conductive pins 531-532 in an example embodiment. As illustrated by this example, the first CFRP panel 220-1 includes a top surface 510, a bottom surface 511, and a first group of pins 531. Similarly, the second CFRP panel 220-2 includes a top surface 512, a bottom surface 513, and a second group of pins 532. Thus, each of the CFRP panels 220 may include its own subset of the pins 531-532. For example, the first group of pins 531 may be inserted into a wet layup of the first CFRP panel 220-1 prior to cure, the second group of pins 532 may be inserted into a wet layup of the second CFRP panel 220-2 prior to cure, and the pins 531-532 may be cured with their respective CFRP panels 220.

In general, when the CFRP panels 220 are properly fastened together with the fastener 310, a portion of the bottom surface 511 of the first CFRP panel 220-1 contacts a portion of the top surface 512 of the second CFRP panel 220-2. That is, although FIGS. 3-9 show gaps between the CFRP panels 220 to more clearly illustrate placement of the pins 531-532, the CFRP panels 220 are pressed against each other when the fastener 310 is attached. The vertically stacked, horizontally offset configuration of the CFRP panels 220 creates an overlap area 520 defined by the opposing far ends 521-522 of the CFRP panels 220, as illustrated by the dashed lines in FIG. 5. The overlap area 520 is similar to the overlaps areas 311-312 described above in FIGS. 3-4 and is generally an area in the xy-plane that is defined by the vertical overlapping of the CFRP panels 220 in the z-direction. As such, the overlap area 520 may vary according to size, shape, and installation configuration of the CFRP panels 220.

As further illustrated in this example, the first group of pins 531 in the first CFRP panel 220-1 have a first spacing 561 (e.g., in the xy-plane) between one another in the overlap area 520, and the second group of pins 532 in the second CFRP panel 220-2 have a second spacing 562 (e.g., in the xy-plane) between one another in the overlap area 520. The first spacing 561 and the second spacing 562 may have a corresponding configuration or pattern such that at least a subset or portion of the total number of the first group of pins 531 contacts at least a subset or portion of the total number of the second group of pins 532 when the CFRP panels 220 are properly joined. That is, the first spacing 561 and the second spacing 562 may correspond to ensure sufficient electrical contact between the CFRP panels 220 and sufficient current paths in the z-direction away from the fastener 310 yet within the overlap area 520 that effectively decreases damage from a lightning strike.

In one embodiment, the pins 531-532 may be installed in the CFRP panels 220 according to a semi-random pattern to achieve a desired effective density. For example, while individual pins 531-532 may be located along the xy-plane randomly, the density of the pins 531-532 per unit area in the overlap area 520 may remain uniform or constant. Thus, the CFRP panels 220 enhanced with the pins 531-532 may be manufactured to ensure that a predefined minimum amount of electrical contact is to be made when joined/fastened with another one of the CFRP panels 220.

The pins 531-532 may also have various lengths and configurations in the z-direction of the CFRP panels 220. As illustrated in FIG. 5, the pins 531-532 may traverse the entire thickness of the CFRP panels 220 to electrically connect the layers 330 (not shown in FIG. 5 for ease of illustration) from a top surface 510/512 to a bottom surface 511/513 of the CFRP panels 220. Alternatively or additionally, the pins 531-532 may traverse a portion of the thickness of the CFRP panels 220 to electrically connect a portion of the layers 330 of the CFRP panels 220. Thus, the CFRP panels 220 enhanced with the pins 531-532 provides a technical benefit to reduce ply-to-ply energy transitions between the layers 330 (e.g., due to differences in fiber orientations and the anisotropic conductivity of the layers 330) and thus reduce the potential for edge glow or particle ejection as a result of a lightning strike at or near the CFRP panels 220.

Moreover, the pins 531-532 may be exposed at, or protrude from, the top surface 510/512 and/or bottom surface 511/513 of the CFRP panels 220 in a variety of configurations. The pattern of exposure of the pins 531-532 at the top surface 510/512 and/or bottom surface 511/513 may correspond among the CFRP panels 220 to ensure a desirable level of electrical contact in the overlap area 520, similar to that as already described above with respect to the first spacing 561 and the second spacing 562 of the pins 531-532. Furthermore, in some embodiments, the pins 531-532 may be parallel with the fastener 310 and/or perpendicular to the top surface 510/512 and/or bottom surface 511/513 of the CFRP panels 220 (e.g., parallel with the z-direction). It will be appreciated, however, that numerous configurations of the pins 531-532 are possible, examples of which are further described below.

Figure 6:
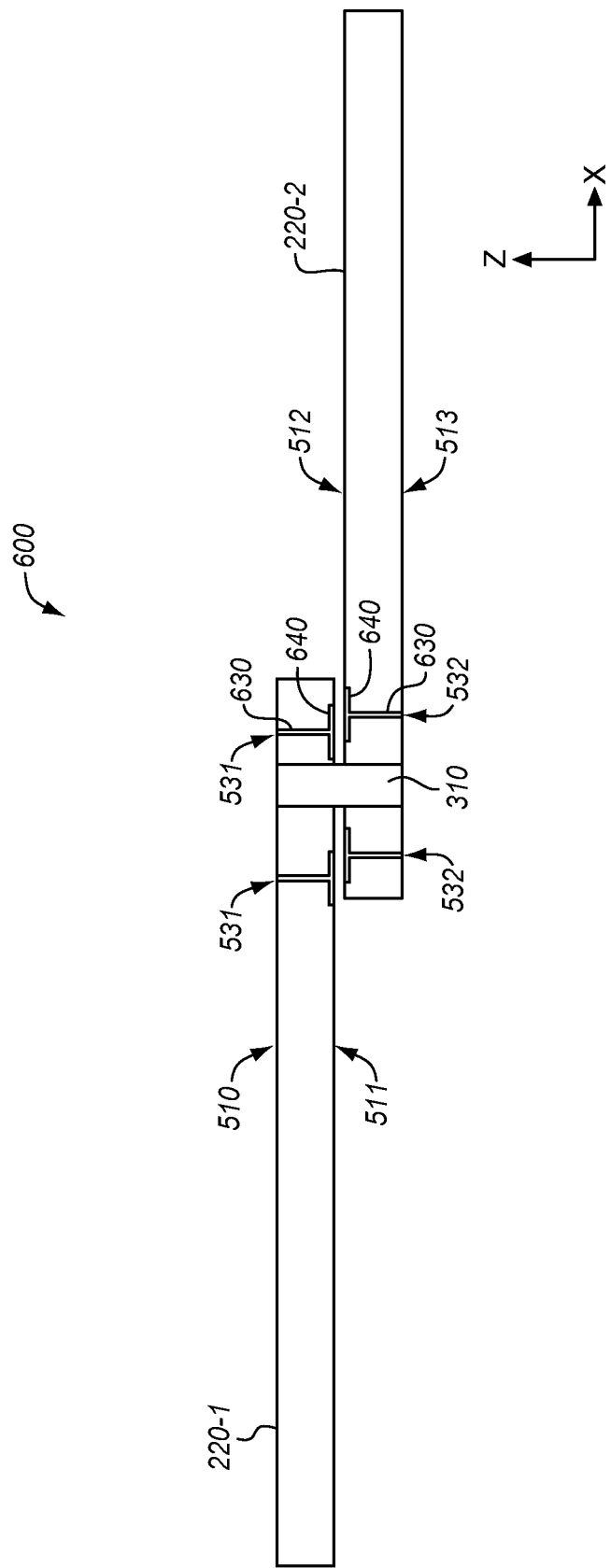
FIG. 6 is a side view of the CFRP panels enhanced with electrically conductive pins in another example embodiment

FIG. 6 is a side view 600 of the CFRP panels 220 enhanced with electrically conductive pins 531-532 in another example embodiment. As shown in this example, each of the pins 531-532 may include a shank 630 and a head 640. The shank 630 is generally an elongated member traversing a thickness of one of the CFRP panels 220. The head 640 is affixed to a far end of the shank 630 and is exposed or protrudes the top surface 510/512 and/or a bottom surface 511/513 of one of the CFRP panels 220. As such, the pins 531-532 of the CFRP panels 220 may correspond according to patterns, spacing, and/or sizes of the heads 640 exposed at the top surface 510/512 and/or a bottom surface 511/513 of one of the CFRP panels 220 such that the heads 640 contact each other when the CFRP panels 220 are properly fastened. Alternatively or additionally, the pins 531-532 may be configured such that at least some portion of the pins 531-532 are not in direct contact but are within sufficient proximity to the pins 531-532 of another CFRP panel to electrically connect the two CFRP panels 220.

Figure 7:
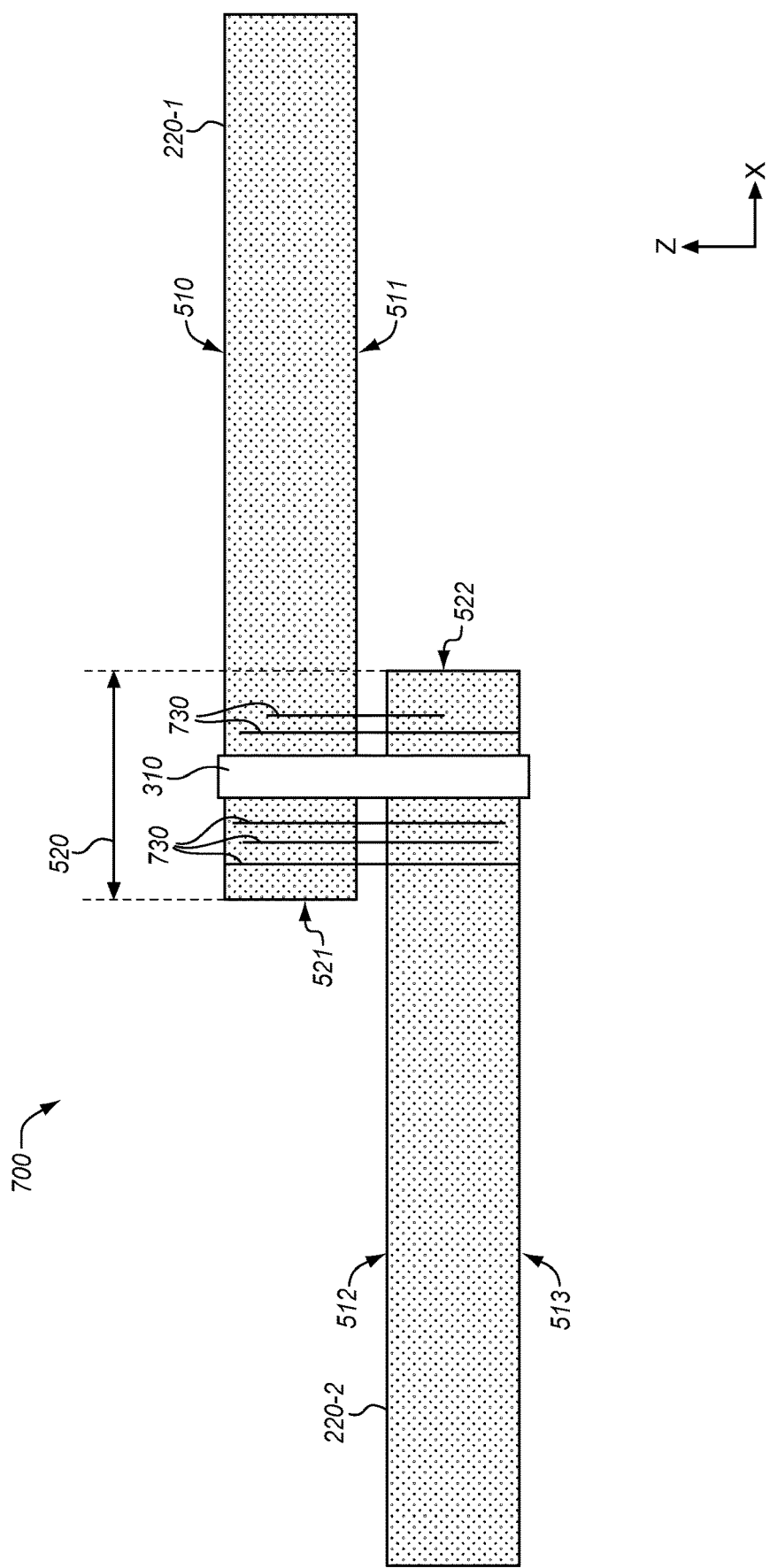
FIG. 7 is a side view of the CFRP panels enhanced with electrically conductive pins in yet another example embodiment.

FIG. 7 is a side view 700 of the CFRP panels 220 enhanced with electrically conductive pins 730 in yet another example embodiment. As shown this example, the pins 730 may be inserted into the first CFRP panel 220-1 and the second CFRP panel 220-2 by puncturing through a thickness of the first CFRP panel 220-1 and the second CFRP panel 220-2. That is, the pins 730 may be installed into the CFRP panels 220 after the CFRP panels 220 are cured and/or joined together by the fastener 310. As illustrated in FIG. 7, the pins 730 may be inserted lengthwise into the CFRP panels 220 to electrically connect between various end points along the z-direction. Such a configuration may advantageously distribute current among various layers 330 (not shown in FIG. 7 for ease of illustration) to spread current from a lightning strike and reduce potential damage resulting therefrom. Features, possible configurations, and advantages of the pins 730 are similar to that already described above with respect to the pins 450 and 531-532 and thus description of such is omitted for sake of brevity.

Figure 8:
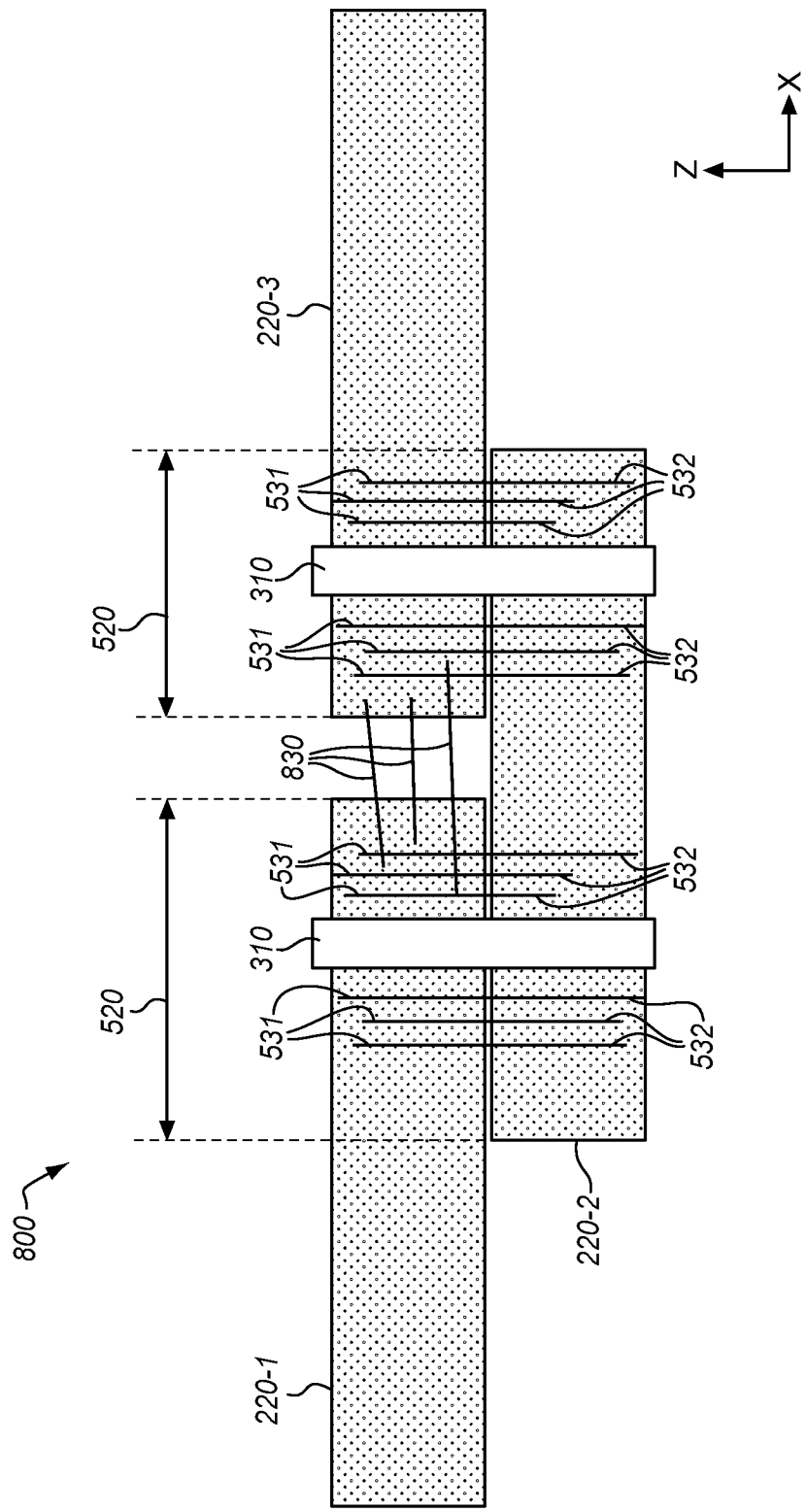
FIG. 8 is a side view of an adjacent CFRP panel connected with electrically conductive pins in an example embodiment.

FIG. 8 is a side view 800 of an adjacent CFRP panel 220-3 connected with electrically conductive pins 830 in an example embodiment. As shown in this example, the first CFRP panel 220-1 and the adjacent CFRP panel 220-3 may contact/align horizontally. The first CFRP panel 220-1 and the adjacent CFRP panel 220-3 may also be joined to a common CFRP panel (e.g., the second CFRP panel 220-2) via fasteners 310. The pins 830 may be punctured into the CFRP panels 220 to electrically connect the first CFRP panel 220-1 and the adjacent CFRP panel 220-3. The pins 830 are generally oriented lengthwise along the xy-plane, but may have end points at different locations along the z-direction to spread current to various layers 330 (not shown in FIG. 8 for ease of illustration) of the CFRP panels 220.

Figure 9:
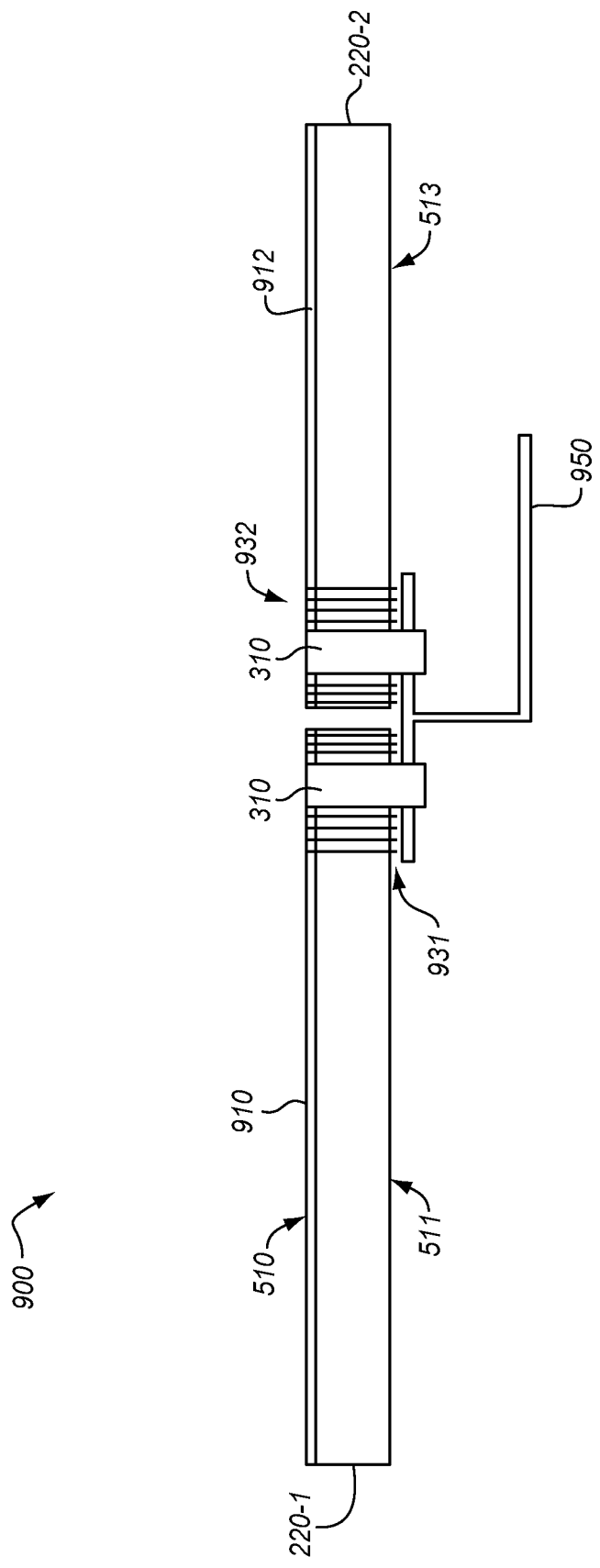
FIG. 9 is a side view of adjacent CFRP panels connected with electrically conductive pins in another example embodiment.

FIG. 9 is a side view 900 of adjacent CFRP panels 220 connected with electrically conductive pins 830 in another example embodiment. As shown in this example, the first CFRP panel 220-1 and the second CFRP panel 220-2 may contact/align horizontally. Moreover, the first CFRP panel 220-1 and the second CFRP panel 220-2 may each include a metal foil 910/912 or mesh along respective top surfaces 510/512. The metal foil 910/912 may include, for example, a copper or aluminum skin of the aircraft 100. The first CFRP panel 220-1 and the second CFRP panel 220-2 further include a first group of pins 931 and a second group of pins 932, respectively. The pins 931-932 extend in the z-direction into the metal foil 910 at one end and may protrude at the bottom surfaces 511/513 of the CFRP panels 220 at the other end.

The fasteners 310 join the CFRP panels 220 to a metallic frame 950. The metallic frame 950 may include, for example, a structural body of the aircraft 100 (e.g., aluminum, titanium, etc.) such as a frame, rib, stringer, etc. As the fasteners 310 are tightened, the metallic frame 950 may be pressed into the protruding ends of the pins 931-932 to electrically connect the first CFRP panel 220-1, the second CFRP panel 220-2, and the metallic frame 950. In some embodiments, the pins described herein may be located within proximity of the fasteners 310 to sufficiently spread currents along different paths in the z-direction for a particular area (e.g., similar to the overlap areas described above). Alternatively or additionally, one or more of the pins described herein may be located outside such a particular area to distribute currents in areas other than fastener-CFRP interfaces.

Figure 10:
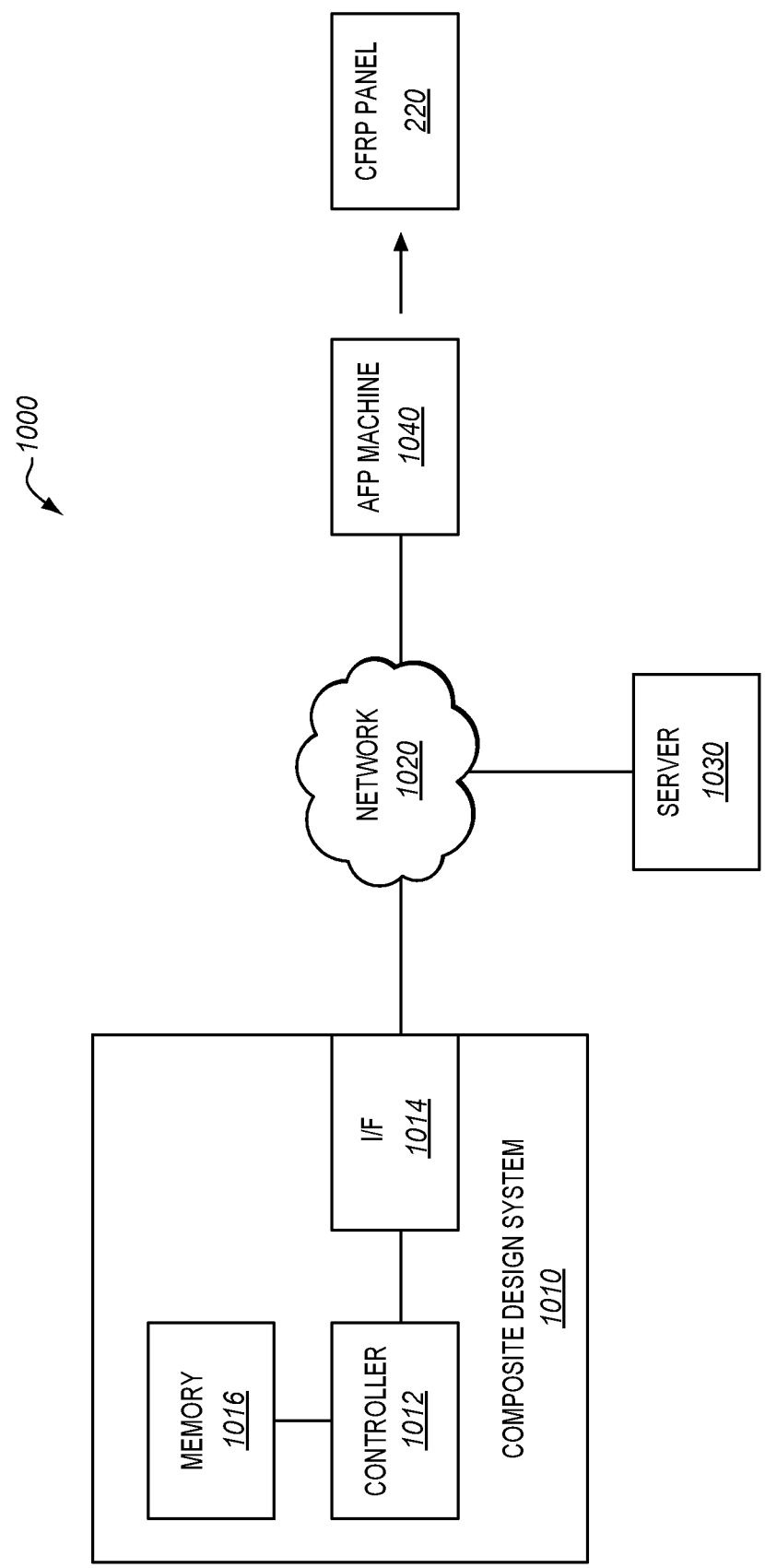
FIG. 10 is a block diagram of a composite manufacturing environment in an example embodiment.

FIG. 10 is a block diagram of a composite manufacturing environment 1000 in an exemplary embodiment. According to FIG. 10, the environment 1000 includes a composite design system 1010, which is capable of designing CFRP panels 220. Composite design system 1010 configures CFRP panels 220 to a desired strength and conductivity at or near CFRP-fastener interfaces and may direct the Automated Fiber Placement (AFP) machine 1040 to manufacture CFRP panels 220 according to the design.

The composite design system 1010 includes controller 1012, interface (I/F) 1014, and memory 1016. Controller 1012 utilizes I/F 1014 to access rules constraining how CFRP panels 220 may be constructed, information describing the geometry of CFRP panels 220, and/or other information. The I/F 1014 may acquire this information from server 1030 via a network 1020. Controller 1012 also generates designs for CFRP panels 220 which may be stored by controller 1012 within memory 1016. Controller 1012 may be implemented, for example, as custom circuitry, as a processor executing programmed instructions, or some combination thereof. I/F 1014 comprises any suitable combination of circuitry and/or components for transmitting data (e.g., via network 1020). Memory 1016 comprises any suitable data storage device such as a hard disk, flash memory, etc. Further details of the operation of composite design system 1010 will be described with regard to FIG. 11 below.

Figure 11:
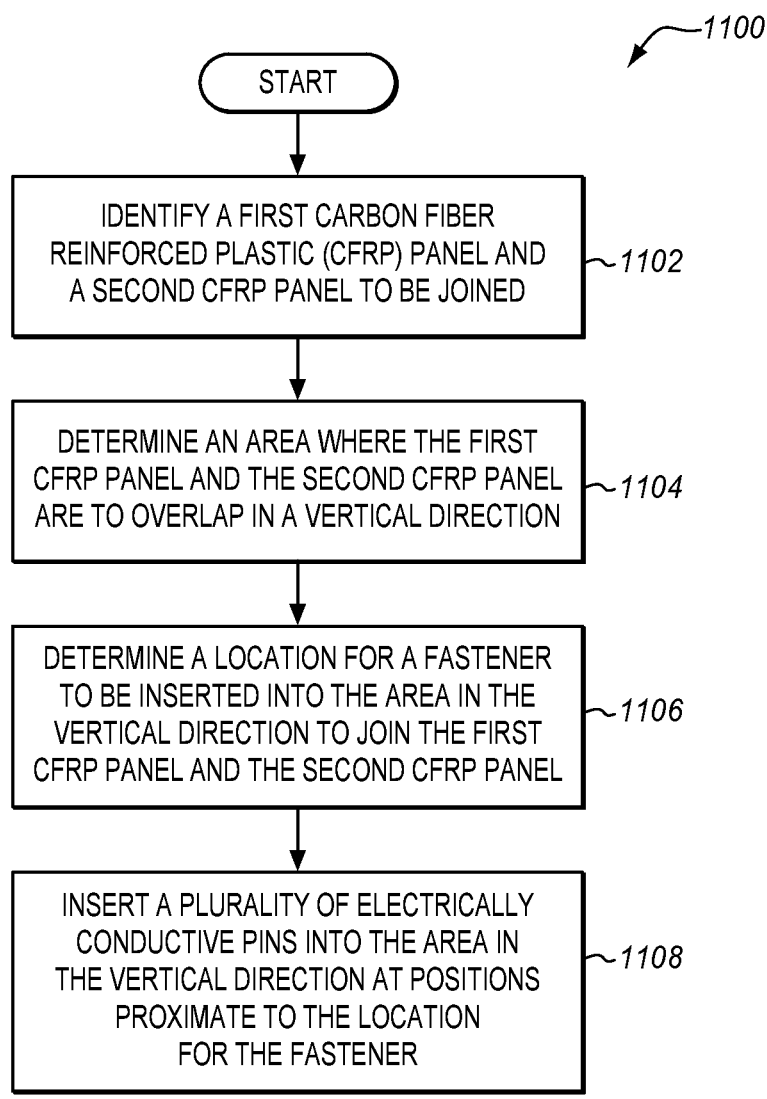
FIG. 11 is a flowchart illustrating a method for constructing CFRP panels in an example embodiment.

FIG. 11 is a flowchart illustrating a method 1100 for constructing CFRP panels 220 in an example embodiment. The steps of method 1100 are described with reference to composite design system 1010 of FIG. 1, but those skilled in the art will appreciate that method 1100 may be performed in other systems. The steps of the flowcharts described herein are not all inclusive and may include other steps not shown. The steps described herein may also be performed in an alternative order.

In step 1102, the controller 1012 identifies a first CFRP panel and a second CFRP panel to be joined. In doing so, the controller 1012 may receive input via the I/F 1014 indicating a geometry of one or more of the CFRP panels 220. This information may indicate which CFRP panels are adjacent/neighboring, and may further include an expected number of plies for each different fiber orientation to be laid at each CFRP panel (e.g., a final depth/thickness and composition).

In step 1104, the controller 1012 determines an area where the first CFRP panel and the second CFRP panel overlap in the vertical direction. In step 1106, the controller 1012 determines a location for a fastener to be inserted into the area to join the first CFRP panel and the second CFRP panel. In step 1108, the controller 1012 directs the AFP machine 1040 to insert a plurality of electrically conductive pins into the area in the vertical direction at positions proximate to the location for the fastener. The area may be the overlap area of the panels previously described.

The pins may be inserted/punctured into an already cured CFRP panel or inserted/positioned in a wet lay-up of the CFRP panel and then cured with the CFRP panel. For instance, the CFRP panels may include layers 330 bonded together by a polymer matrix material (e.g., a thermoset resin such as epoxy or a thermoplastic) consecutively laid up and cured to form the CFRP panel, referred to as wet lay-up. The AFP machine 1040 may position the pins in the wet lay-up at locations around where the fastener is to be located and in various patterns across the overlap area as previously described. The particular number and/or location of the pins inserted into the CFRP panel may be defined according to design considerations that balance strength of the CFRP panel at the overlapping area with the desired spread of conductivity in the overlapping area that provide current paths in the z-direction alternative to that provided by the fastener. In some embodiments, multiple CFRP panels or parts may be co-cured, meaning they are laid up and then cured together.

The method 1100 of FIG. 11 may advantageously provide the improved electrical conductive feature of the panels described above in an automated fashion and without any additional cure time. Previous techniques for lightning mitigation include secondary operations (e.g., covering the fastener with a polysulfide cap seal, applying edge sealant, and/or bonding existing panels with a conductive splice) which increase the cost and flow time of aircraft production and also undesirably increase the parasitic weight of the aircraft. By contrast, the configuration and techniques of inserting the pins as described herein accomplish more evenly distributed current densities in the CFRP structures in a manner that minimizes impact on factory flow time and aircraft weight.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. An apparatus comprising:
a first Carbon Fiber Reinforced Plastic (CFRP) panel;
a second CFRP panel that overlaps with the first CFRP panel in a vertical direction;
a fastener to join the first CFRP panel with the second CFRP panel, the fastener extending in the vertical direction in an area where the first CFRP panel and the second CFRP panel overlap; and
a plurality of electrically conductive pins in each of the first CFRP panel and the second CFRP panel, wherein the pins extend in the vertical direction proximate to the fastener to electrically connect the first CFRP panel and the second CFRP panel in the area where the first CFRP panel and the second CFRP panel overlap,
wherein the pins include:
a first group of pins inside the first CFRP panel each having heads exposed at a bottom surface of the first CFRP panel; and
a second group of pins inside the second CFRP panel each having heads exposed at a top surface of the second CFRP panel.

2. The apparatus of claim 1, wherein:
the first group of pins and the second group of pins have a corresponding spacing to electrically connect the first CFRP panel and the second CFRP panel when the first CFRP panel and the second CFRP panel overlap in the vertical direction and are joined by the fastener.

3. The apparatus of claim 2, wherein:
the spacing of each of the first group of pins and the second group of pins is semi-random.

4. The apparatus of claim 1, wherein:
the pins are parallel with the fastener and perpendicular to layers of carbon fiber in the first CFRP panel and the second CFRP panel.

5. The apparatus of claim 1, wherein:
the first CFRP panel and the second CFRP panel are offset such that far ends of each of the first CFRP panel and the second CFRP panel overlap in the vertical direction.

6. The apparatus of claim 1, wherein:
the pins are inserted into one of the first CFRP panel and the second CFRP panel by puncturing through a thickness of one of the first CFRP panel and the second CFRP panel.

7. The apparatus of claim 1, wherein:
the pins are inserted into a wet layup of one of the first CFRP panel and the second CFRP panel prior to cure of one of the first CFRP panel and the second CFRP panel.

8. The apparatus of claim 1, wherein:
the pins are cured with one or more of the first CFRP panel and the second CFRP panel.

9. The apparatus of claim 1, wherein:
the first CFRP panel and the second CFRP panel form a composite structure of an aircraft.

10. The apparatus of claim 9, wherein:
the composite structure comprises a wing of the aircraft.

11. The apparatus of claim 1, wherein:
each the pins are individually smaller than the fastener.

12. The apparatus of claim 1, wherein:
the pins are configured to provide a path for electrical current away from the fastener.

13. The apparatus of claim 1, wherein:
one or more of the pins have a different length through the first CFRP panel and the second CFRP panel as compared to other ones of the pins.

14. The apparatus of claim 1, wherein:
one or more of the pins terminate at different end positions within the first CFRP panel and the second CFRP panel as compared to other ones of the pins.

15. The apparatus of claim 1, wherein:
a material of the pins includes one of carbon, aluminum, and titanium.

16. The apparatus of claim 1, wherein:
in the area where the first CFRP panel and the second CFRP panel overlap, a number of the pins is greater than a number of fasteners.

17. The apparatus of claim 1, wherein:
the fastener is configured to mechanically join the first CFRP panel with the second CFRP panel, the pins extend through the first CFRP panel and the second CFRP panel to provide a path for electrical current away from the fastener, and the pins include a longitudinal body that does not mechanically join the first CFRP panel with the second CFRP panel.

18. The apparatus of claim 1, wherein:
the area where the first CFRP panel and the second CFRP panel overlap includes a single one of the fastener and multiple ones of the pins.

19. The apparatus of claim 1, wherein:
the pins are distributed throughout the area where the first CFRP panel and the second CFRP panel overlap to spread through-thickness current conduction away from the fastener.

20. The apparatus of claim 1, wherein:
the fastener is configured to cause the first group of pins to press against the second group of pins.

* * * * *